(12) United States Patent
Dirisio

(10) Patent No.: US 6,640,053 B1
(45) Date of Patent: Oct. 28, 2003

(54) CAMERA FRONT SEAL ASSEMBLY

(75) Inventor: Anthony Dirisio, Rochester, NY (US)

(73) Assignee: Eastman Kodak Company, Rochester, NY (US)

(*) Notice: Subject to any disclaimer, the term of this patent is extended or adjusted under 35 U.S.C. 154(b) by 0 days.

(21) Appl. No.: 10/317,490

(22) Filed: Dec. 12, 2002

(51) Int. Cl.$^7$ .................. G03B 17/08; G02B 23/16; H04N 7/18; H04N 9/47
(52) U.S. Cl. .................. 396/29; 396/535; 359/612; 359/513; 348/81
(58) Field of Search .................. 396/25, 29, 535, 396/529, 348, 349, 72; 359/601, 611, 612, 819, 513, 823, 507; 348/141

(56) References Cited

U.S. PATENT DOCUMENTS

| | | | |
|---|---|---|---|
| 3,904,284 A | 9/1975 | Blank et al. | 352/78 R |
| 5,034,762 A | 7/1991 | Kohmoto | 396/72 |
| 5,056,903 A | 10/1991 | Nakamura et al. | 359/513 |
| 5,066,965 A | 11/1991 | Tanaka et al. | 396/29 |
| 5,115,350 A * | 5/1992 | Tanaka | 359/823 |
| 5,212,509 A | 5/1993 | Kosako et al. | 396/29 |
| 5,241,338 A | 8/1993 | Luther | 396/349 |
| 5,335,028 A | 8/1994 | Kosako | 396/29 |
| 5,374,970 A | 12/1994 | Satoh et al. | 396/29 |
| 5,673,099 A | 9/1997 | Haraguchi et al. | 396/29 |
| RE35,679 E | 12/1997 | Tanaka | 359/694 |
| 6,024,457 A | 2/2000 | Kawai et al. | 359/611 |
| 6,038,087 A | 3/2000 | Suzuki et al. | 359/819 |
| 6,072,640 A | 6/2000 | Tanaka | 359/694 |
| 2001/0048557 A1 * | 12/2001 | Akami et al. | 359/513 |

\* cited by examiner

*Primary Examiner*—Russell Adams
*Assistant Examiner*—Rochelle Blackman
(74) *Attorney, Agent, or Firm*—Robert Luke Walker

(57) ABSTRACT

A camera seal assembly has a first retainer having an opening. The first retainer defines an axis extending through the opening. A second retainer is disposed in fixed relation to the first retainer. The second retainer faces the first retainer in spaced relation along the axis. A barrel extends through the opening. The barrel has a cylindrical barrel wall. A collar has a side wall facing the barrel wall. The barrel is movable relative to the collar. A stack of alternating lesser and greater rings is disposed between the first and second retainers and between the barrel wall and side wall. The lesser rings are movable relative to the greater rings in directions radial to the axis. The stack has a centered state, in which each lesser ring more closely adjoins the barrel wall than the side wall and each greater ring more closely adjoins the side wall than the barrel wall.

21 Claims, 13 Drawing Sheets

CAMERA FRONT SEAL ASSEMBLY

FIELD OF THE INVENTION

The invention relates to photographic cameras and equipment and to seals and more particularly relates to camera front seal assemblies.

BACKGROUND OF THE INVENTION

Seals have long been used in telescoping and retractable lens barrels to keep out water and dust and to block light. Many such seals are relatively hard and fit tightly between close fitting parts. This is an effective approach, but costs can be reduced if tolerances are increased. This desire for reduced costs has lead to the use of seals that have a flexible portion that flaps back and forth during use. This approach is also effective, but the seal is subject to some constraints, which are necessary to keep the flapping portion from being too fragile. A further limitation, in some instances, is that of providing adequate thickness of seal to block entry of light. A further limitation is the necessity of a shaping the seal in some manner that allows the seal to be held in position during use. It is not difficult to make seals having relatively complex shapes, however, a burden can be presented by the requirement of keeping such seals in inventory until needed. Still another limitation is that many seals impose a frictional load that must be overcome during relative movement of parts.

U.S. Pat. No. 6,038,087 discloses a camera having a light sealed with a pair of inclined fins that are in sliding contact with the surface of a relatively movable part.

The provision of light locks between rotating parts is well known. U.S. Pat. No. 3,904,284 discloses a labyrinth seal between a core and the wall of a film magazine.

It would thus be desirable to provide a seal assembly that can block light, yet is simple and inexpensive and does not have to flap during use.

SUMMARY OF THE INVENTION

The invention is defined by the claims. The invention, in broader aspects, provides a camera seal assembly that has a first retainer having an opening. The first retainer defines an axis extending through the opening. A second retainer is disposed in fixed relation to the first retainer. The second retainer faces the first retainer in spaced relation along the axis. A barrel extends through the opening. The barrel has a cylindrical barrel wall. A collar has a side wall facing the barrel wall. The barrel is movable relative to the collar. A stack of alternating lesser and greater rings is disposed between the first and second retainers and between the barrel wall and side wall. The lesser rings are movable relative to the greater rings in directions radial to the axis. The stack has a centered state, in which each lesser ring more closely adjoins the barrel wall than the side wall and each greater ring more closely adjoins the side wall than the barrel wall.

It is an advantageous effect of the invention to provide an improved seal assembly that can block light, yet is simple and inexpensive and does not have to flap during use.

BRIEF DESCRIPTION OF THE DRAWINGS

The above-mentioned and other features and objects of this invention and the manner of attaining them will become more apparent and the invention itself will be better understood by reference to the following description of an embodiment of the invention taken in conjunction with the accompanying figures wherein.

DETAILED DESCRIPTION OF THE INVENTION

Figure 1:
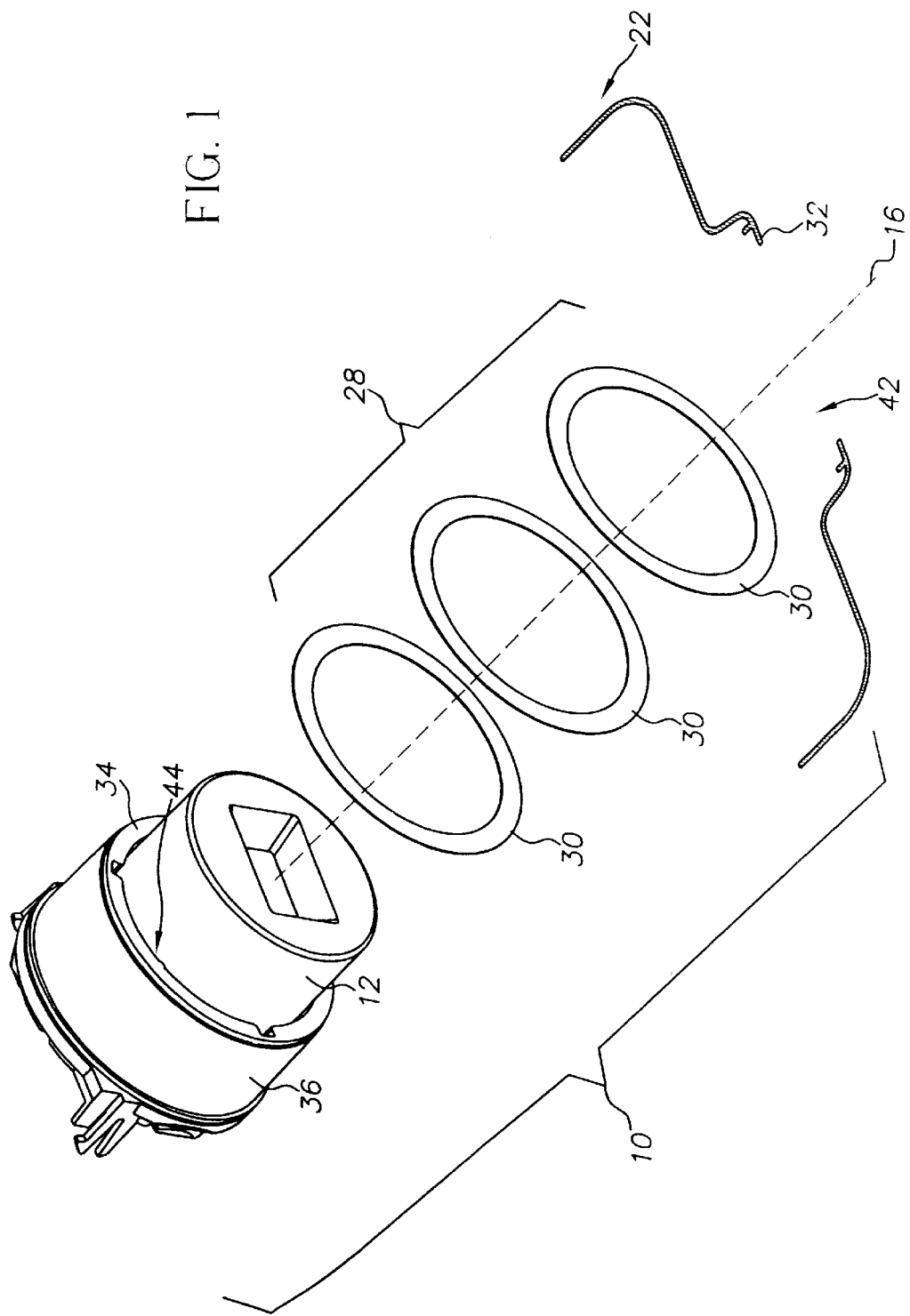
FIG. 1 is a partially exploded perspective view of an embodiment of the seal assembly.
Figure 2:
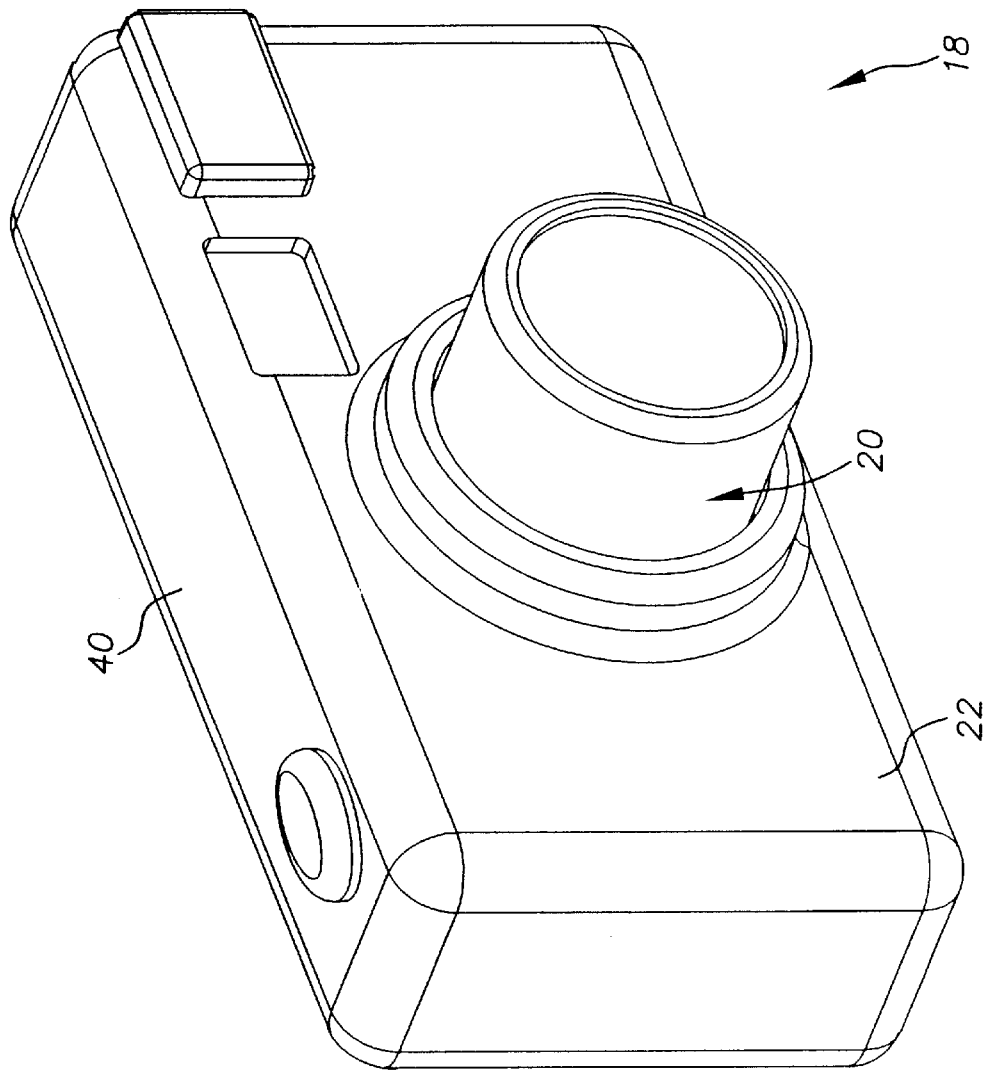
FIG. 2 is a front perspective view of a camera that includes the seal assembly of FIG. 1.
Figure 3:
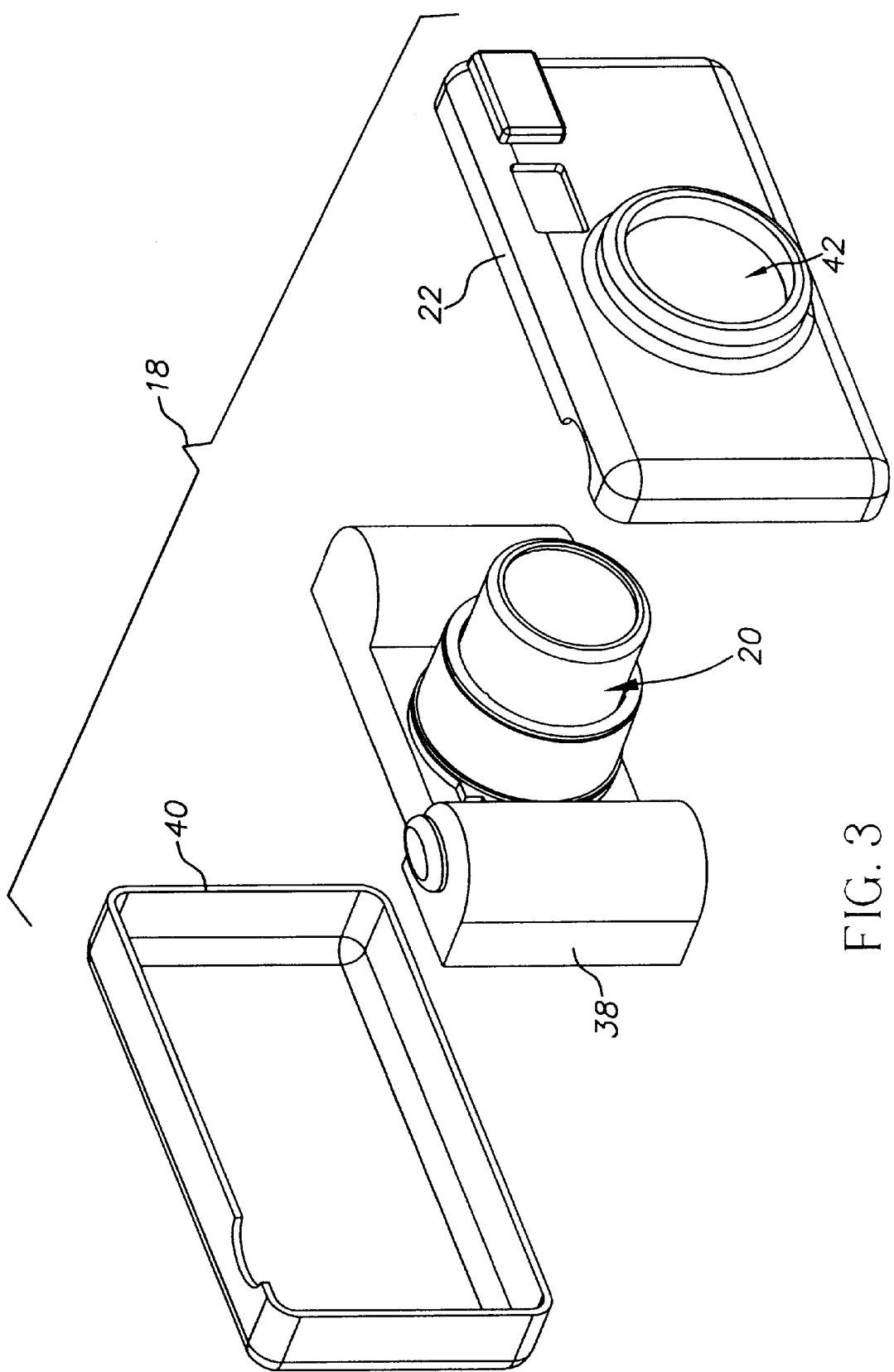
FIG. 3 is a partially exploded front perspective view of the camera of FIG. 2.
Figure 4:
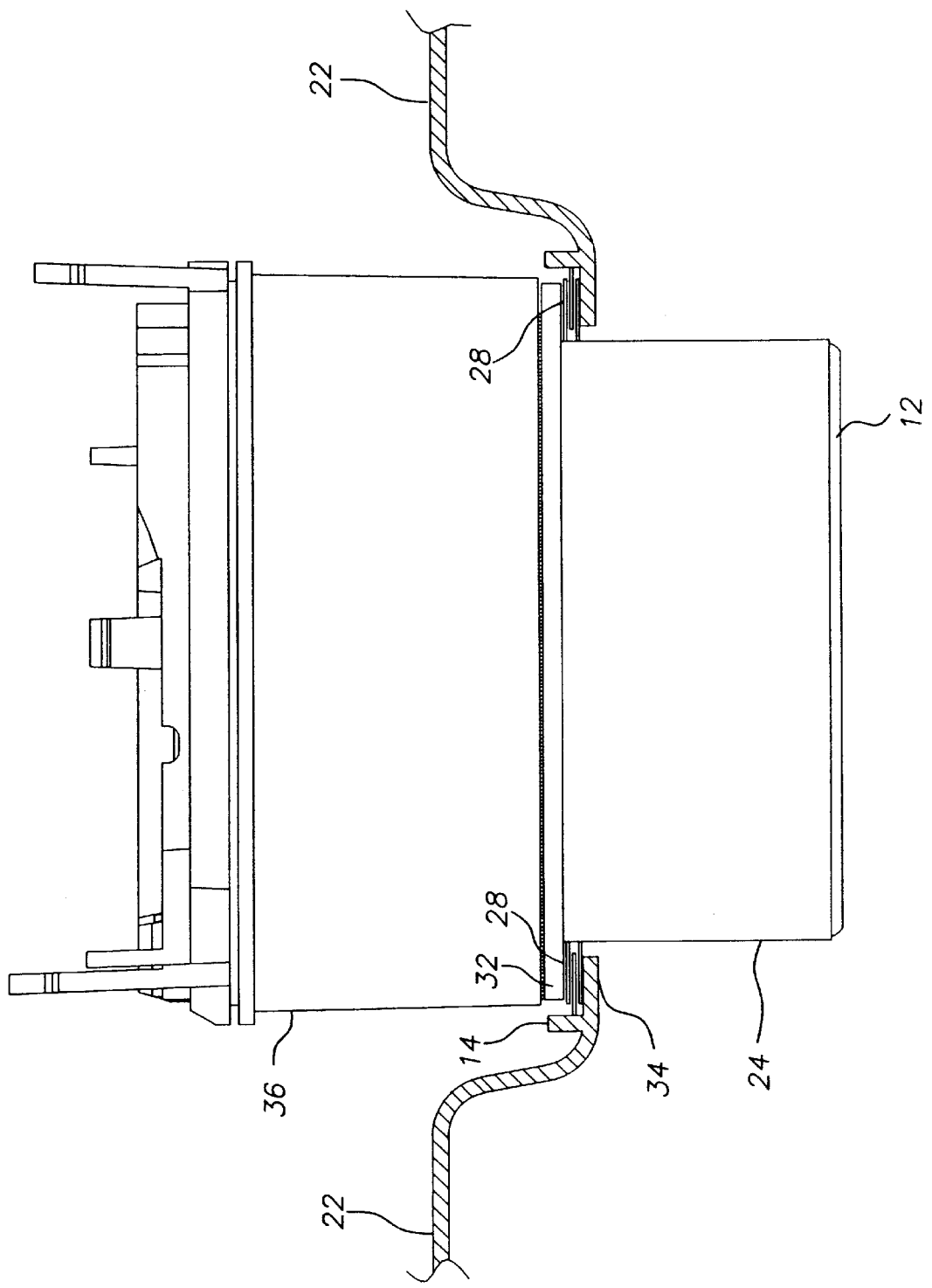
FIG. 4 is a top view of the seal assembly of FIG. 1. The front cover and seal stack are shown in cross-section.
Figure 5:
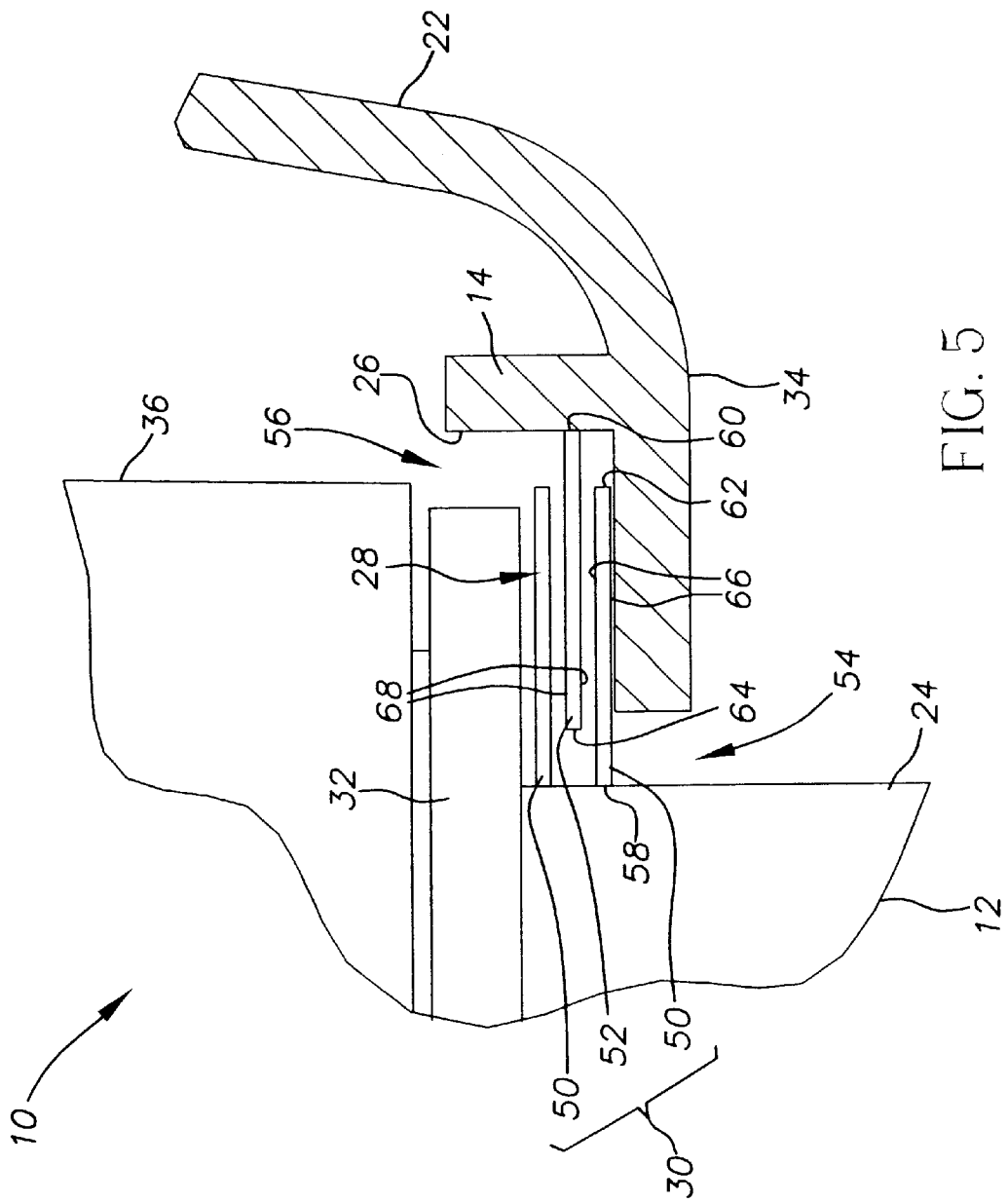
FIG. 5 is a partial close-up of the view of a FIG. 4.

The seal assembly 10 has one structural part, a barrel 12, that moves relative to another structural part, a collar 14. Movement can include a translation radial to an axis 16 and can also include a translation along the axis 16 or a rotation about the axis 16 or both. The seal assembly 10 provides a light-tight seal between the barrel 12 and collar 14 during movement. Within an allowed range of axial misalignment, the seal assembly 10 imposes little or no side load on the barrel 12. Lens barrel movement is smoother and easier, since the frictional burden introduced by a side load is reduced or eliminated.

Various structures are described herein as "encircling" the barrel 12 or some other feature. The barrel 12 can have other cross-sectional shapes, such as oval or square with rounded corners. The opening and other features are matched to the cross-sectional shape of the barrel 12. For convenience, in discussions herein, the barrel 12 is described as being circular in cross-section. It will be understood that like considerations apply to embodiments having other shapes of barrel 12. Similarly, the term "encircling" is used in a broad sense and does not imply and is not limited to circular shapes.

Referring now to FIGS. 1–5, in a particular embodiment, the seal assembly 10 is part of a camera 18. In this case, the barrel 12 is a lens barrel of a zoom or focusable lens 20. The collar 14 is part of the front cover 22. The barrel 12 has a cylindrical barrel wall 24. The collar 14 has a side wall 26 of that faces the barrel wall 24. A stack 28 of seal rings 30 are disposed between the barrel wall 24 and the side wall 26. The rings 30 are trapped between two retainers 32,34. In the embodiment of FIGS. 1–5, a base retainer 32 is a structural member of a lens base 36. The lens base 36 is mounted to a frame or chassis 38 that is held between front and rear covers 22,40 of the camera 18. The lens base 36 is mounted in a fixed position on the chassis 38. (The term "fixed" and like terms are used herein in the sense of a physical position or relationship that is in immobile and unchanging.)

In this embodiment, opposite the base retainer 32 is a cover retainer 34, which is a part of the front cover 22. The cover retainer 34, the collar 14, and the remainder of the front cover 22 can all be parts of a one-piece plastic casting.

Figure 14:
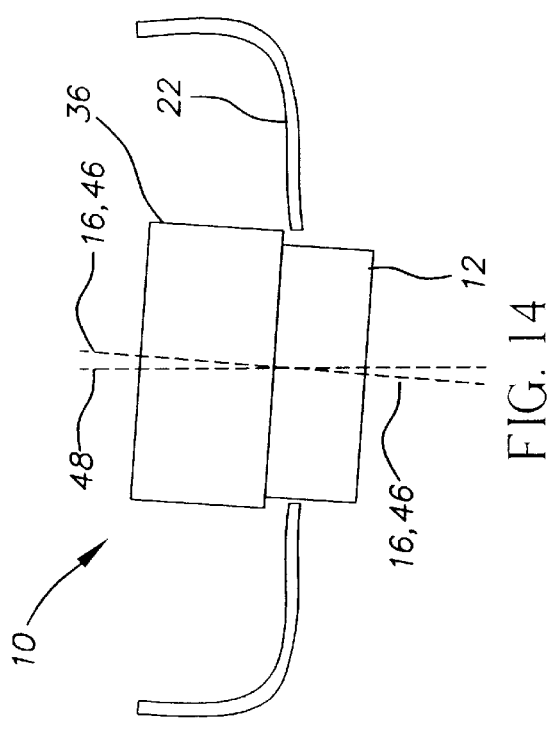
FIG. 14 is the same view as FIG. 13, but the lens barrel axes is angularly misaligned relative to the front cover opening axis. The lens barrel axis and lens base axis are aligned.
Figure 16:
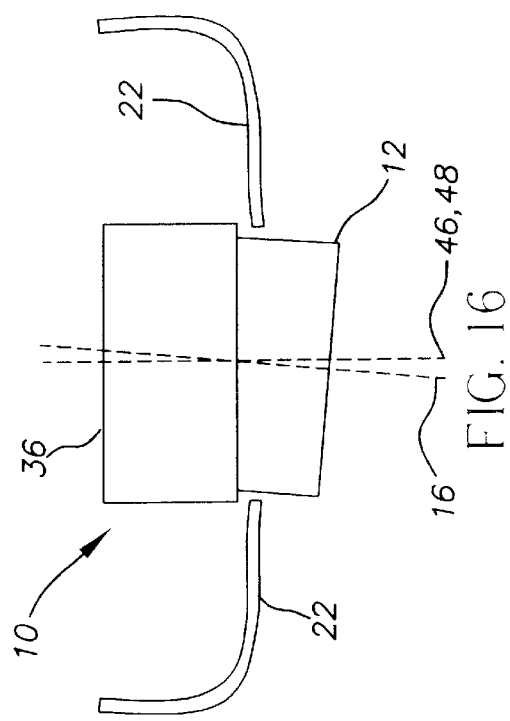
FIG. 16 is the same view as FIG. 13, but the lens barrel axis is angularly misaligned relative to the front cover opening axis and the lens base axis. The lens barrel axis and front cover opening axis are aligned.
Figure 13:
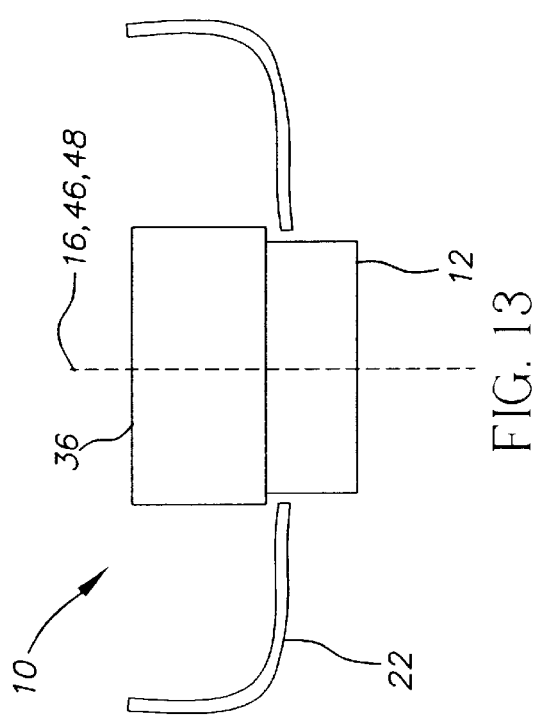
FIG. 13 is a semi-diagrammatical view of the seal assembly of FIG. 1. The axes of the lens barrel, lens base, and front cover opening are all aligned.
Figure 15:
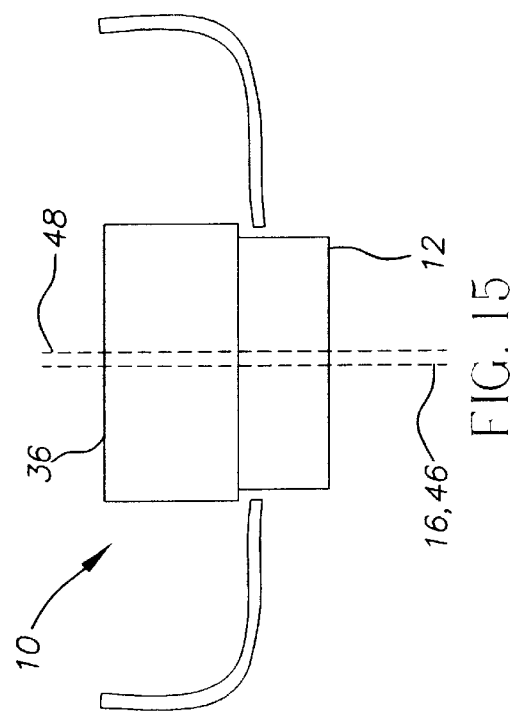
FIG. 15 is the same view as FIG. 13, but the lens barrel axes is radially misaligned relative to the front cover opening axis. The lens barrel axis and lens base axis are aligned.

Each retainer 32,34 surrounds and defines a respective opening 42,44. The barrel 12 is movable into and out of the lens base 36 through the two openings 42,44. The barrel 12 defines the barrel axis 16. The opening 42 of the collar 14 defines a lens base axis 46. The opening 44 of the front cover 22 defines a front cover opening axis 48. FIG. 13 illustrates an alignment of the lens base 36, lens barrel 12, and front cover 22, in which all three axes 16,46,48. This alignment, in which all of the axes 16,46,48 are at least approximately aligned is not mandatory. The seal assembly 10 can accommodate, without degradation of light tightness, misalignments between the axes. As illustrated in FIGS. 14–16, the misalignments can be angular, or radial translations, or both.

In the following, alignment is generally discussed in relation to only the axis 16 of the lens barrel 12 and the axis 48 of the cover retainer 34. This simplifies discussion and, in addition, reflects the practical considerations applicable to the illustrated embodiments. For example, referring to the embodiment of FIGS. 1–5, close axial alignment is generally required between parts of a zoom lens system 20 for proper functioning. On the other hand, close alignment between such a lens system 20 and the cover 22 is not important to functioning, except as necessary to provide light tightness and deter entry of foreign objects.

The rings 30 are provided in a stack 28 of alternating lesser and greater rings 50,52. Rings 30 are opaque and are arranged so as to provide a labyrinth that blocks entry of light. This also deters entry of foreign objects. Close dimensions from retainer-to-retainer can be provided, if desired, to deter entry of small airborne contaminants.

In the embodiment of FIGS. 1–4, one greater ring 52 is disposed between two lesser rings 50, for a total of three rings 30. In the embodiment shown in FIGS. 5–8, there are two greater rings 52 and three lesser rings 50. In both of these embodiments, there is a gap 54 between the barrel wall 24 and the cover retainer 34. Each stack 28 has a lesser ring 50a outermost. The lesser ring 50a closes the gap 54 to deter entry of foreign matter into the stack 28 of rings 30. In these embodiments, there is also a gap 56 between the collar 14 and the base retainer 32. This gap 56 is left open, since a lesser ring 50b is innermost in the stack 28. If the gap 56 were to present a contamination problem, then a greater ring 52 could be added (or removed in the case of the embodiment of FIGS. 5–8) to close the gap 56 with an innermost greater ring 52. This would change the odd number of rings, three in the embodiment of FIGS. 1–4 and five in the embodiment of FIGS. 5–8, to an even number of rings, either two or four, respectively.

A number of rings of three or more is preferred, since this provides light locking without the inclusion of either retainer 32,34 in the light locking function and without a requirement of close tolerances on the spacing of the two retainers 32,34. Use of a lesser number of rings 30 increases the constraints on the retainers 32,34 themselves. For example, rough surfaced retainers might allow some light entry if only two rings were used. The use of additional rings 30 beyond the three gives a measure of additional light blocking, but the added benefit quickly becomes marginal. On the other hand, a variable number of rings 30 can be used in manufacturing 30 to accommodate differences in the fit of individual front covers and lens bases. In this case, the additional rings act as shims that keep the fit of the stack 28 between the retainers 32,34 at a desired tolerance.

In the embodiments illustrated, both the barrel wall 24 and the side wall 26 are circular cylinders. This is not limiting. The walls 24,26 can have other cylindrical shapes such as square with rounded corners. It is convenient if the barrel wall 24 and side wall 26 both have the same cross-sectional shape, such as, circular or square with rounded corners (of different sizes); but this is not limiting. The side wall 26 of the collar 14 can have a different cross-sectional shape than the barrel wall 24. The side wall 26 also need not be cylindrical. The side wall 26 can step or slope inward or outward relative to the cover axis 48 and can be sloped in word or outward. For simplicity, discussion here is generally limited to embodiments in which the side wall 26 is cylindrical. Other shapes can be provided in a similar manner. Additional parts can also extend axially from the collar 14 or barrel 12 or both. Any such parts are not subject to the same constraints as are discussed here in relation to the barrel 12 and collar 14.

The rings 30 each have opposed inner and outer margins. The inner margins 58 of the lesser rings 50 each closely adjoin the barrel wall 24. The outer margins 60 of the greater rings 52 each closely adjoin the collar side wall 26. The rings 30 are sized such that, when the barrel 12 is centered relative to the retainer axes 46,48, outer margins 62 of the lesser rings 50 are spaced from the side wall 26 and inner margins 64 of the greater rings 52 are spaced from the barrel wall 24. For convenience, inner and outer rings 50,52 are spoken of here in the plural. It will be understood that like considerations/apply when only one ring 30 of the particular type is present.

Within the stack 28, the lesser rings 50 and greater rings 52 are movable relative to each other in axial directions. This movement may only occur during assembly of the camera 18 or may occur during use of the camera 18. For example, a radial misalignment of a lens barrel 12 and cover 22 that is accommodated during assembly, may not change during use. Alternatively, a cover 22 may flex during use changing alignment of the barrel 12 and cover 22 and resulting in a movement of the rings 30. Likewise, during use, rings 30 can move to follow movement of a lens barrel 12 that is angularly misaligned relative to a cover 22.

The rings 30 are shaped so as to permit relative movement of the greater and lesser rings 50,52. In the embodiment shown in the figures, each ring 30 is shaped like a flattened washer. Other shapes can be provided if desired. For example, each of the rings 30 can be curved in the same manner.

In the illustrated embodiments, the surfaces 66,68 of innermost and outermost rings 30 contact respective retainers. The remaining surfaces 66,68 of those rings 30 and the surfaces 66,68 of the other rings 30 lie against a ring 30 of the opposite type, lesser against greater and greater against lesser. Spacers (not shown) can be provided between adjoining rings 30, if desired. This is undesirable, however, to the extent that the light locking effect of the labyrinth is degraded. The outside margins of any spacers are smaller than the outside margins of greater rings 52 and the inside margins of any spacers are larger than the inside margins of lesser rings 50.

The inner margins of the lesser rings 50 and the outer margins of the greater rings 52 can contact the barrel wall 24 and side wall 26 respectively. This is not mandatory. Very good light locking can be provided if the lesser ring 50 is within its own the thickness of the barrel wall 24. Good light locking can also be provided by use of larger numbers of rings 30 in a stack 28, accompanied by slightly larger gaps between the barrel wall 24 and the lesser rings 50. The same considerations apply to the greater rings 52.

The rings 30 can be made out a variety of materials. It is highly preferred that the rings 30 are non-elastomeric, since elastomeric rings would be likely to bind rather than slide smoothly past each other. On the other hand, it is preferable that the rings 30 are flexible, since this provides some protection against impact damage. In a particular embodiment of the invention, the rings 30 are composed of metallized non-elastomeric polymer such as Mylar™ or polyethylene terephthalate.

Figure 6:
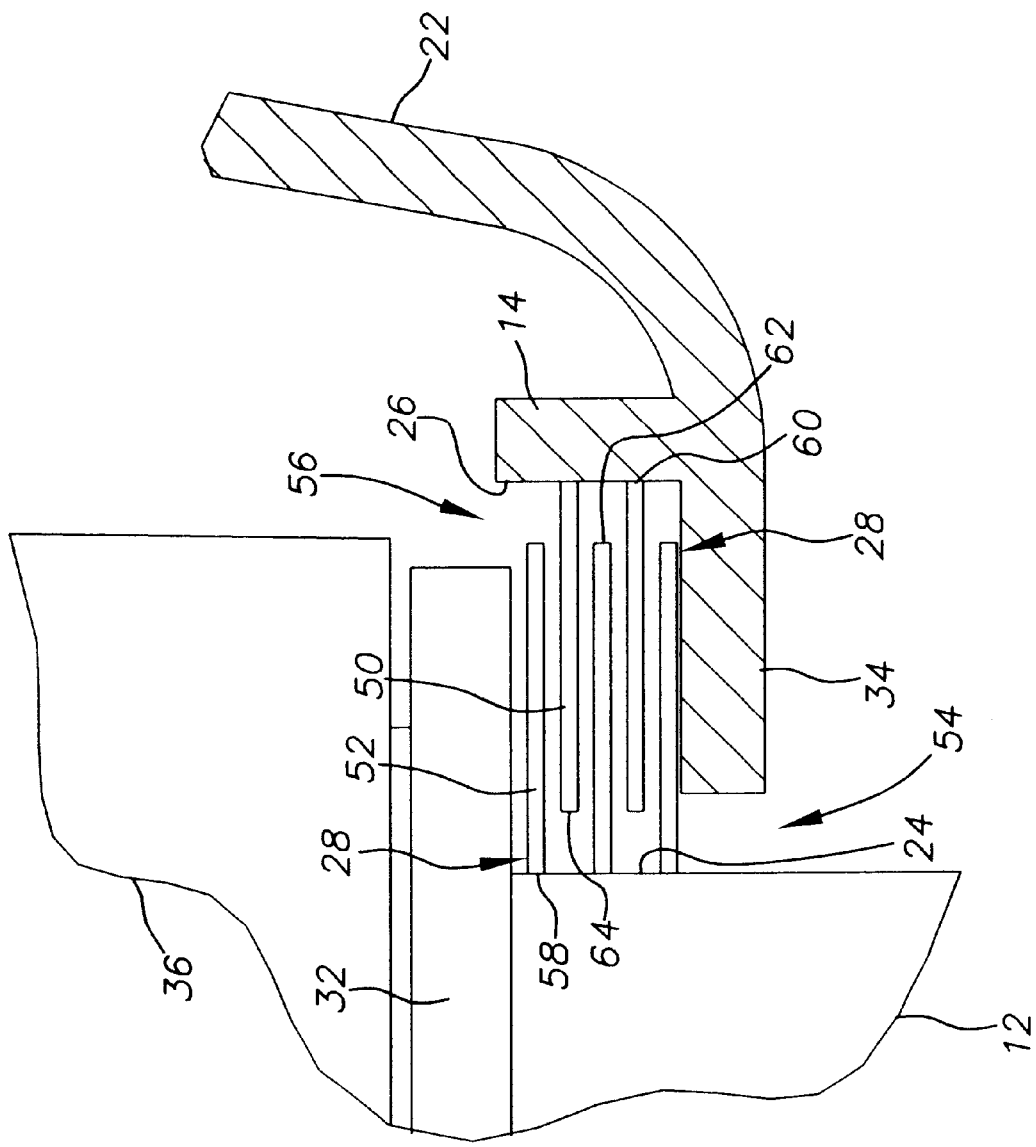
FIG. 6 is the same view as FIG. 5, but of a modified embodiment of the seal assembly.
Figure 7:
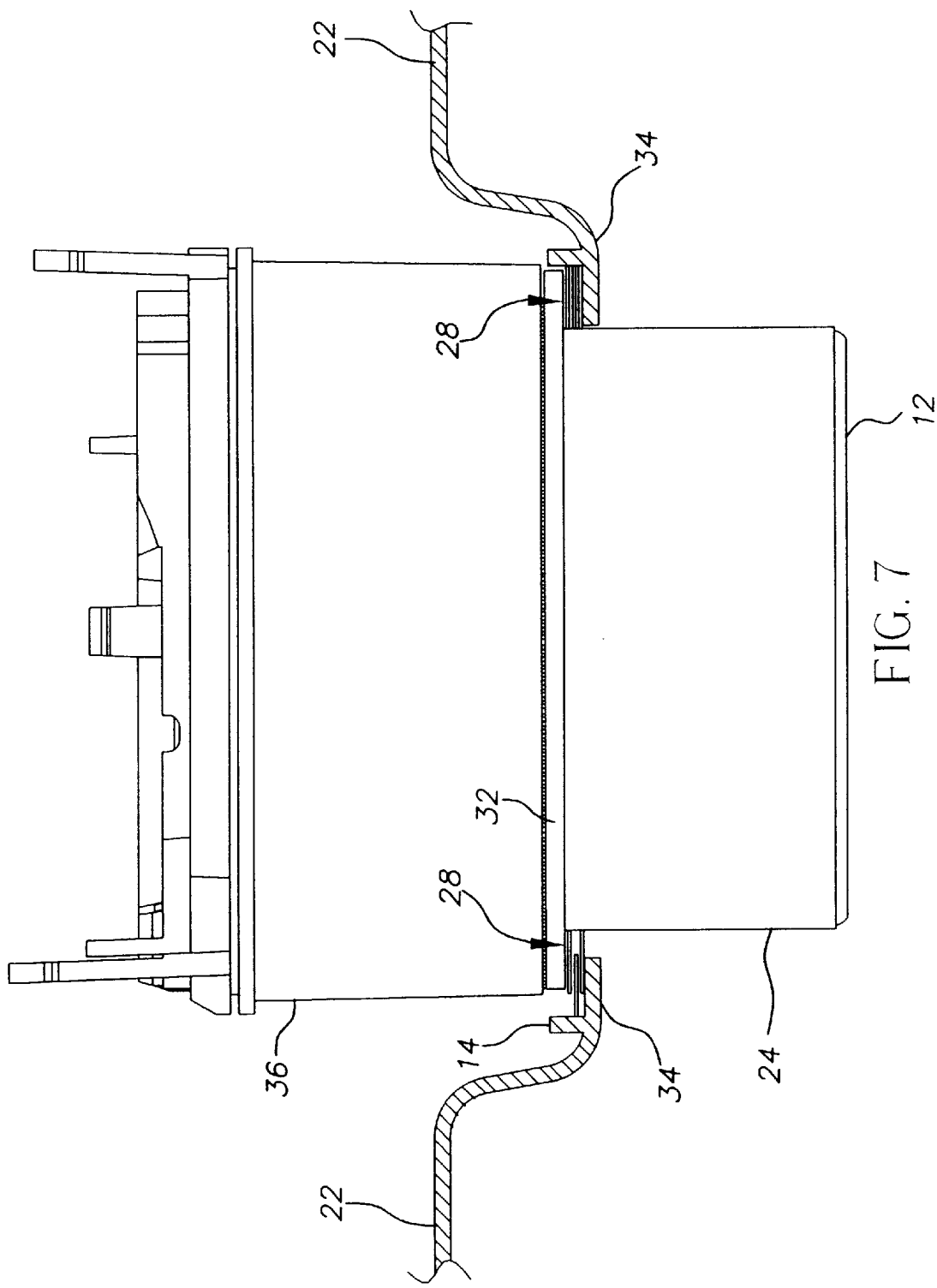
FIG. 7 is the same view as FIG. 4 of the modified seal assembly of FIG. 6, with the exception of that the lens barrel is shown in a position of maximum radial translation relative to the axis defined by the opening in the cover.
Figure 8:
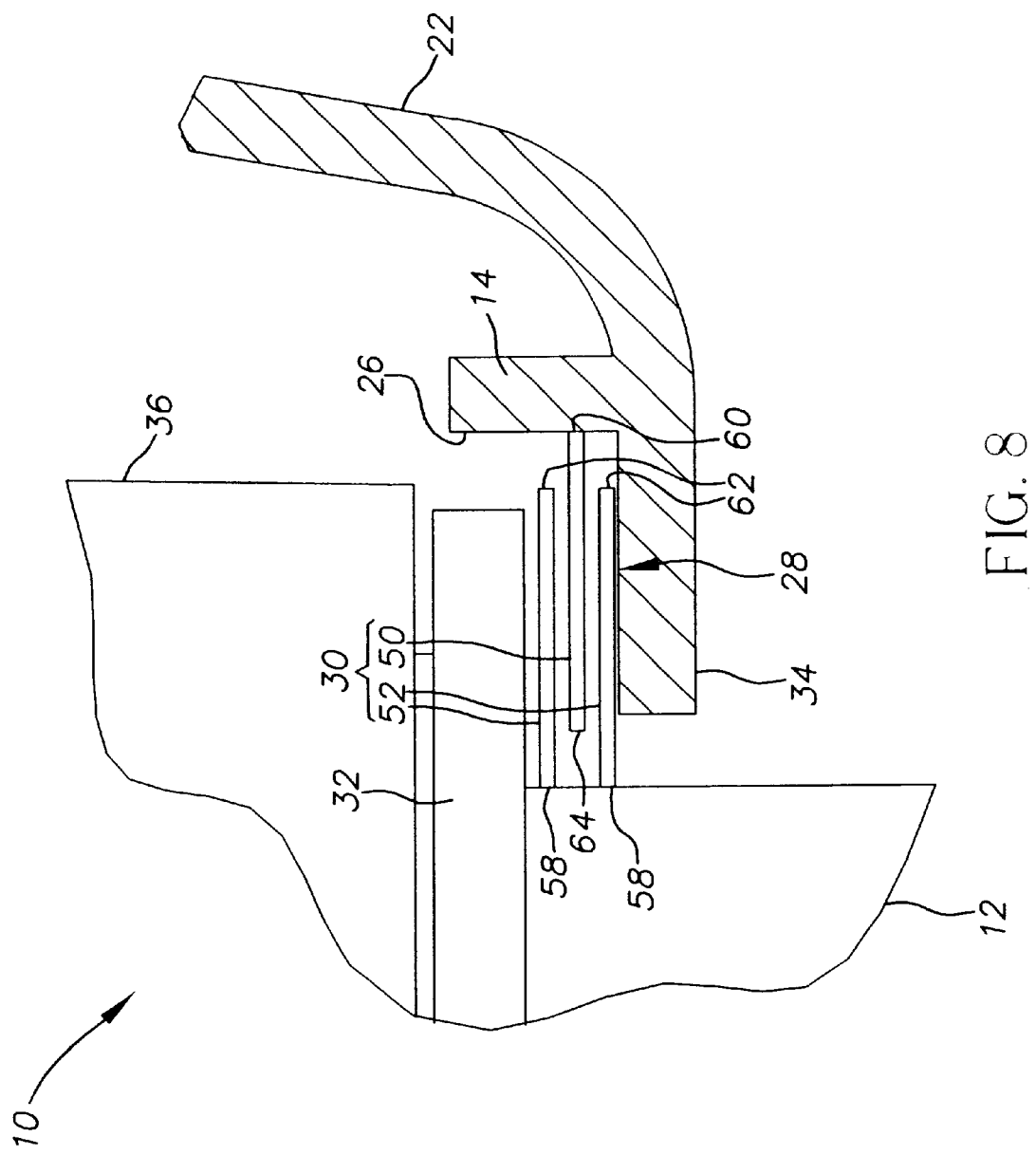
FIG. 8 is a partial enlargement of the view of FIG. 7, showing part of the ring stack.
Figure 9:
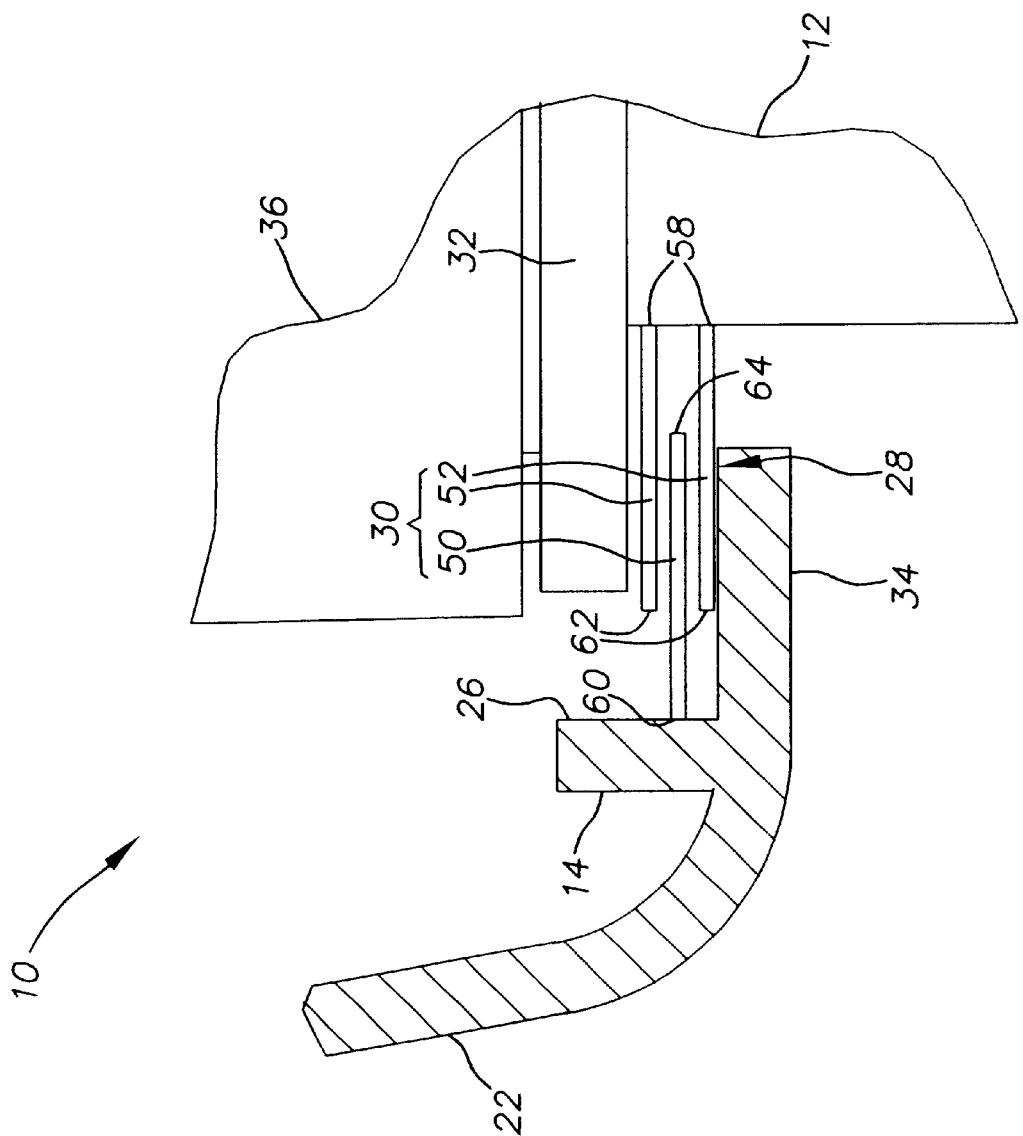
FIG. 9 is another partial enlargement of the view of FIG. 7, showing an opposite part of the ring stack from that shown in FIG. 8.

FIGS. 6–9 illustrate how the seal assembly 10 accommodates movement of the barrel 12. In FIG. 6, the barrel 12 is centered relative to the axis 48 of the cover retainer. The extent of overlap of the greater and lesser rings 50,52 is equal all around the circumference of the stack 28. At all points in the stack 28, the rings 30 resemble FIG. 6. If the barrel 12 is moved in a radial direction, the greater and lesser rings 50,52 move relative to each other. This continues until movement of the barrel 12 is stopped by the rings 30. FIG. 8 illustrates the overlap of the greater and lesser rings 50,52 in the part of the stack 28 in the direction toward which the barrel 12 was moved. The rings 30 have a full overlap. Inner margins 64,58 of the greater and the lesser rings 50,52 are in contact with the barrel wall 24 and outer margins 60,62 of the greater and lesser rings 50,52 are in contact with the side wall 26. This blocks further movement. Opposite this region of the stack 28, the greater and lesser rings 50,52 are at a maximal separation. Radial movement of the barrel 12 can alternatively be limited by other structure. In that case, it may not be possible for the rings 30 to reach the state shown in FIGS. 8–9.

Figure 10:
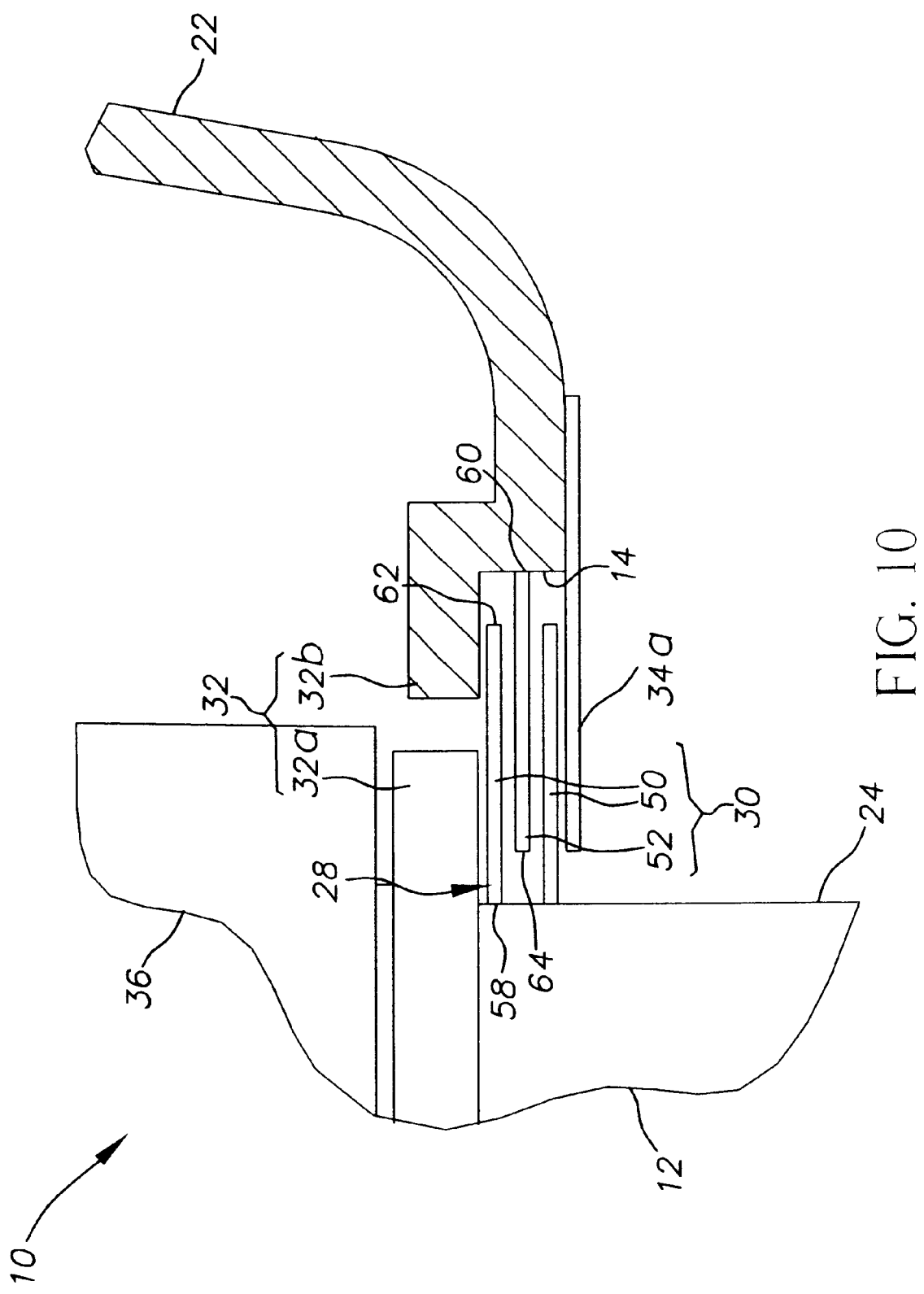
FIG. 10 is a top, close-up view of another embodiment of the seal assembly. The front cover and seal stack are shown in cross-section.
Figure 11:
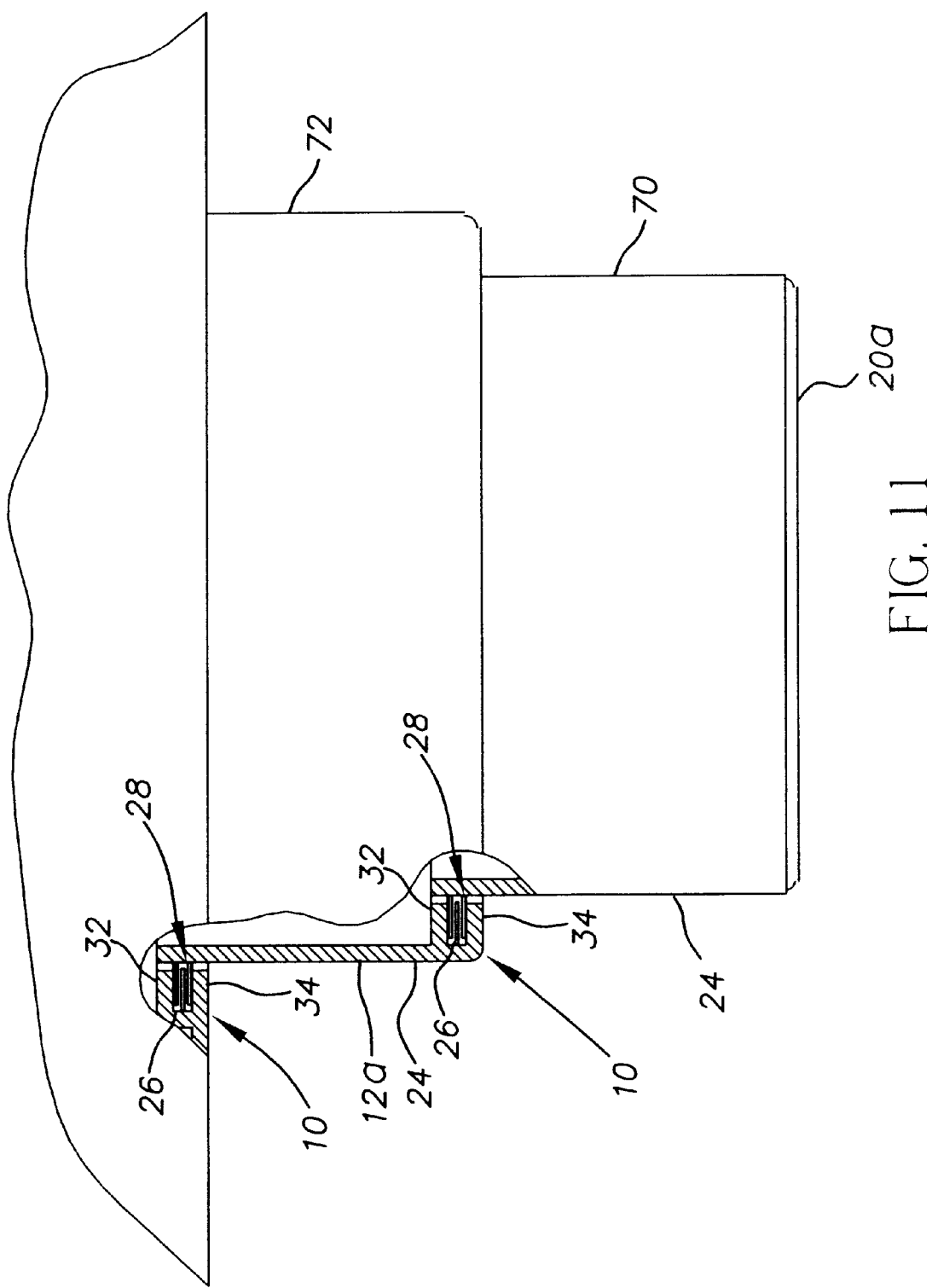
FIG. 11 is a partially cut away top view of another embodiment of the seal assembly.
Figure 12:
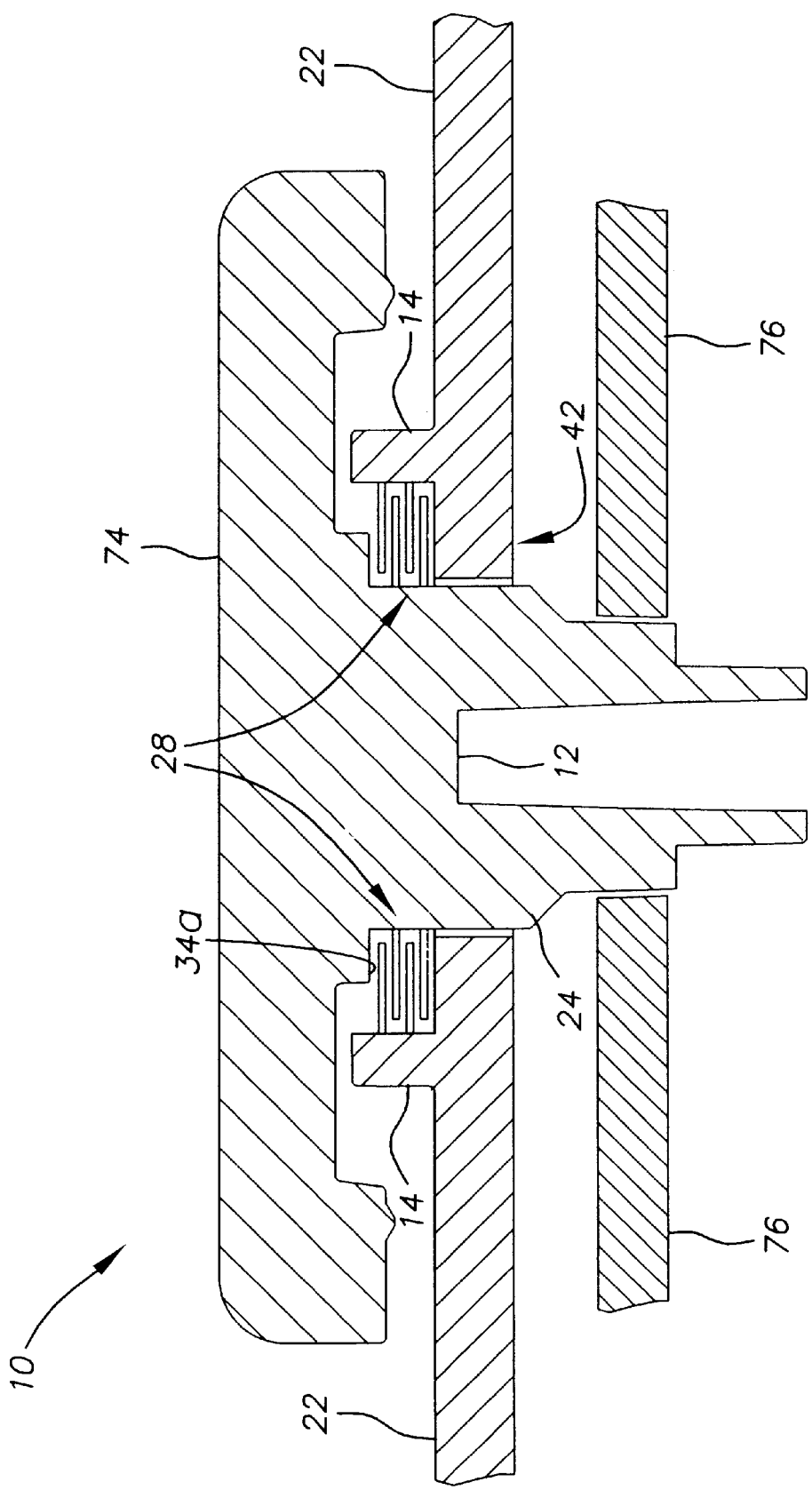
FIG. 12 is a sectional view of another embodiment of the seal assembly.

FIGS. 10–12 illustrate other embodiments in which some of the parts of the seal assembly are changed. In FIG. 10, the cover retainer 32a is made of a ring that is fastened to the outside of the front cover 22 by adhesive of the like. The base retainer 32 has two parts a first portion 32a that is part of the lens base 36 and a second portion 32b that is part of the cover 22 that protrudes inward from the collar 14. In FIGS. 11–12, the barrel 12 and collar 14 are different parts than those just described.

In FIG. 11, a telescoping lens 20a has a pair of seal assemblies 10. Two segments 70,72 of the telescoping lens 20a move axially relative to each other or, alternatively, move axially and rotate relative to each other. With the outermost seal assembly, both retainers 32,34 are joined to the inner barrel 12a. The barrel wall 24 is the outside wall of the outer barrel 12a. The side wall 26 is the inside wall of the inner barrel 12b. With the innermost seal assembly, both retainers 32,34 are attached to the lens base 36. The barrel wall 24 is the outside wall of the inner barrel 12b. The side wall 26 is part of the lens base 36.

In FIG. 12, the seal assembly 10 includes a winding knob 74 that is joined to a barrel 12 that extends through an opening 42 in a cover 22. The winding knob mates with an internal part 76. The winding knob 74 is rotated, but does not move in an axial direction after assembly. The retainers 32a,34a are parts of the knob 74 and cover 22.

The invention has been described in detail with particular reference to certain preferred embodiments thereof, but it will be understood that variations and modifications can be effected within the spirit and scope of the invention.

What is claimed is:

1. A seal assembly comprising:
   a first retainer having an opening, said first retainer defining an axis extending through said opening;
   a second retainer disposed in fixed relation to said first retainer, said second retainer facing said first retainer in spaced relation along said axis;
   a barrel extending through said opening, said barrel having a cylindrical barrel wall;
   a collar having a side wall facing said barrel wall, said barrel being movable relative to said collar;
   a stack of alternating lesser and greater rings disposed between said first retainer and said second retainer and between said barrel wall and said side wall, said lesser rings being movable relative to said greater rings in directions radial to said axis, said stack having a centered state wherein each said lesser ring more closely adjoins said barrel wall than said side wall and each said greater ring more closely adjoins said side wall than said barrel wall.

2. The seal assembly of claim 1 wherein said stack has at least three rings.

3. The seal assembly of claim 1 wherein said barrel is radially movable relative to said axis between a centered position and an offset position.

4. The seal assembly of claim 3 wherein said barrel is movable along said axis relative to said collar.

5. The seal assembly of claim 3 wherein said barrel is rotatable about said axis relative to said collar.

6. The seal assembly of claim 1 wherein said collar is joined to one of said retainers.

7. The seal assembly of claim 1 wherein said retainers and said collar each encircle said barrel.

8. The seal assembly of claim 1 wherein said rings are each flat.

9. The seal assembly of claim 1 wherein said rings are each flexible and non-elastomeric.

10. The cover seal assembly of claim 1 wherein said rings are composed of metallized polymer.

11. The seal assembly of claim 1 wherein said rings are circular.

12. The seal assembly of claim 1 wherein said first retainer and said collar are parts of a one-piece cover member.

13. The seal assembly of claim 12 wherein said barrel is a lens barrel.

14. A seal assembly comprising:
   a retainer having an opening, said retainer defining an axis extending through said opening;
   a barrel extending through said opening, said barrel having a barrel wall paralleling said axis;

a collar having a side wall facing said barrel wall, said barrel being movable relative to said collar;

a stack of alternating lesser and greater rings trapped between said barrel wall and said side wall, said stack having at least three rings, said rings being loose from each other;

wherein said barrel is radially movable relative to said axis between a centered position and an offset position, each said lesser ring more closely adjoining said barrel wall than said side wall and each said greater ring more closely adjoining said side wall than said barrel wall when said barrel is in said centered position.

15. The seal assembly of claim 14 wherein said rings each contact both said barrel wall and said side wall in said offset position.

16. The seal assembly of claim 14 further comprising a second retainer, said rings being disposed against and trapped between said retainers.

17. The seal assembly of claim 16 wherein said retainers and said collar each encircle said barrel.

18. The seal assembly of claim 17 wherein said rings are each flat and opaque.

19. The seal assembly of claim 18 wherein said rings are flexible and non-elastomeric.

20. The seal assembly of claim 18 wherein said barrel is a lens barrel.

21. The seal assembly of claim 20 wherein said rings are circular.

* * * * *